US010118197B2

(12) United States Patent
Boese

(10) Patent No.: US 10,118,197 B2
(45) Date of Patent: Nov. 6, 2018

(54) AUTOMATIC FOLDING AND DEPLOYING DEFLECTORS FOR CONVEYOR

(71) Applicant: Vermeer Manufacturing Company, Pella, IA (US)

(72) Inventor: Aaron Boese, Freeman, SD (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 15/429,347

(22) Filed: Feb. 10, 2017

(65) Prior Publication Data

US 2017/0232475 A1 Aug. 17, 2017

Related U.S. Application Data

(60) Provisional application No. 62/294,778, filed on Feb. 12, 2016.

(51) Int. Cl.
*B07B 1/46* (2006.01)
*B07B 1/00* (2006.01)
*B65G 15/00* (2006.01)
*B65G 41/00* (2006.01)
*B07B 1/22* (2006.01)

(52) U.S. Cl.
CPC ............ *B07B 1/005* (2013.01); *B07B 1/22* (2013.01); *B65G 15/00* (2013.01); *B65G 41/002* (2013.01)

(58) Field of Classification Search
CPC .......... B07B 1/005; B07B 1/22; B65G 15/00; B65G 41/002
USPC .......................... 209/241, 257, 288, 420, 421
See application file for complete search history.

(56) References Cited

U.S. PATENT DOCUMENTS

| 2,838,846 A | * | 6/1958 | Cowlin | D06F 58/02 34/130 |
| 3,892,563 A | * | 7/1975 | La Point | B03B 5/42 209/17 |
| 4,203,493 A | * | 5/1980 | Miller | E01B 27/107 171/16 |
| 4,923,128 A | * | 5/1990 | Ostrowski | A01F 29/005 241/101.742 |
| 5,120,433 A | * | 6/1992 | Osadchuk | B07B 1/005 209/235 |

(Continued)

FOREIGN PATENT DOCUMENTS

| JP | 2012016649 | * | 1/2012 | ............... B07B 1/28 |
| JP | 2012016649 A | | 1/2012 | |

OTHER PUBLICATIONS

Foreign Reference Translation Okutani, Shiohata, "Vibration screen for classifying to be sorted objects", Jul. 2010, Japanese Patent Publication (Year: 2012).*

(Continued)

*Primary Examiner* — Terrell H Matthews
(74) *Attorney, Agent, or Firm* — Mechant & Gould P.C.

(57) ABSTRACT

A deflector for a mobile material separating machine includes a deflector body hingedly attached to a trommel screen frame and a conveyor movable with respect to the trommel screen frame. The conveyor has a stowed position and an operating position. The deflector system also includes an automatic linkage pivotably attached to the deflector body and to the conveyor. The linkage moves and guides the deflector body when the conveyor moves between the stowed position and the operating position.

24 Claims, 18 Drawing Sheets

(56) References Cited

U.S. PATENT DOCUMENTS

| | | | | |
|---|---|---|---|---|
| 5,819,950 A * | 10/1998 | McCloskey | ............ | B07B 1/005 |
| | | | | 209/241 |
| 6,006,921 A * | 12/1999 | Zehr | ...................... | B07B 13/16 |
| | | | | 198/311 |
| 6,543,622 B1 * | 4/2003 | Fridman | ................. | B07B 1/005 |
| | | | | 198/861.4 |
| 6,935,587 B2 * | 8/2005 | Brock | .................... | B02C 21/02 |
| | | | | 241/101.76 |
| 7,143,968 B2 | 12/2006 | Brock et al. | | |
| RE42,969 E * | 11/2011 | McCloskey | ............ | B07B 1/005 |
| | | | | 198/313 |
| 8,915,376 B2 * | 12/2014 | Garland | ................. | B07B 11/06 |
| | | | | 209/257 |
| 2004/0182758 A1 * | 9/2004 | McCloskey | ............ | B07B 1/005 |
| | | | | 209/420 |
| 2006/0237346 A1 * | 10/2006 | Fridman | ................. | B07B 1/005 |
| | | | | 209/288 |
| 2008/0092410 A1 * | 4/2008 | Layh | ...................... | E02F 5/226 |
| | | | | 37/142.5 |

OTHER PUBLICATIONS

Machine translation of JP2012016649, translated Jun. 22, 2017, 14 pgs.
European Search Report for European Application No. 17155513, dated Jun. 22, 2017, 8 pgs.
Doppstadt Catalog, Nov. 18, 2014, 15 pgs.

* cited by examiner

AUTOMATIC FOLDING AND DEPLOYING DEFLECTORS FOR CONVEYOR

CROSS-REFERENCE TO RELATED APPLICATION

The present application claims the benefit of U.S. Provisional Patent Application Ser. No. 62/294,778, filed Feb. 12, 2016, which application is hereby incorporated by reference in its entirety.

BACKGROUND

Deflectors may be used in conveyance systems to contain material to a certain area to prevent spillage. Some deflectors can be manually folded and unfolded when the machine to which the deflector is attached changes operating modes (e.g., an operating mode or a transport mode). However, there is a risk of the operator forgetting to fold or unfold the deflector before changing operating modes, thereby leading to damage of the deflector. Further, a manually folding deflector can also impose a safety concern by creating pinch points for the operator to come in contact with.

An example of a machine on which deflectors are commonly used is screening machines used to process unconsolidated material that contains a variety of differently sized particulates into separate consolidated material comprising separate sizes. In some instances, rotary screening trommels that use a substantially cylindrical shaped screening apparatus are used. These rotary screening trommels include a feed end for receiving material and a discharge end for discharging material. Rotary screening trommels operate by receiving unconsolidated material at the inlet, rotating as the material travels length-wise through the cylindrical shaped screening apparatus, and separating smaller material from larger material by allowing the smaller material to fall through the screening trommel during rotation. Larger material is then discharged from the discharge end of the screening trommel. Conveyors are used to move the separated consolidated material away from the screening machine and into separate piles. Deflectors are used to direct material leaving the screening trommel to the conveyers. Improvement in deflector design is needed.

SUMMARY

The present disclosure relates generally to a deflector for a mobile material separating machine. In one possible configuration, and by non-limiting example, the deflector is an automatic deploying and stowing deflector of a rotary trommel screening machine.

In a first aspect of the present disclosure, a deflecting system for a trommel screen is disclosed. The deflecting system includes a rotary trommel screen that has an inlet end and an outlet end. The rotary trommel screen is rotatably attached to a rotary trommel screen frame. The deflecting system also includes a pair of deflectors hingedly attached to the trommel screen frame and positioned at the outlet end of the rotary trommel screen. Further, the deflecting system includes a conveyor pivotally attached to the trommel screen frame and positioned adjacent the outlet end of the rotary trommel screen. The conveyor has a stowed position and an operating position. The deflecting system includes a pair of automatic linkages each pivotably attached to both one deflector and the conveyor. The linkages move and otherwise guide the deflectors when the conveyor moves between the stowed position and the operating position.

In a second aspect of the present disclosure, a deflector system for a trommel screen is disclosed. The deflector system includes a deflector body hingedly attached to a trommel screen frame and a conveyor movable with respect to the trommel screen frame. The conveyor has a stowed position and an operating position. The deflector system also includes an automatic linkage pivotably attached to the deflector body and to the conveyor. The linkage moves and guides the deflector body when the conveyor moves between the stowed position and the operating position.

In a third aspect of the present disclosure, a deflector for a mobile material separating machine is disclosed. The deflector includes a deflector body movably attached to a first frame member and configured to deflect material. The deflector body has a deployed position and a stowed position. The deflector includes a second frame member movable with respect to the first frame member. The second frame member has at least a stowed position, a first operating position, and a second operating position. The deflector body is in the stowed position when the second frame member is in the stowed position, and the deflector body is in the deployed position when the second frame member is in the first operating position and the second operating position. The deflector also includes an automatic extendable linkage pivotably attached to the deflector body and to the second frame member. The extendable linkage has a first length when the second frame member is in the first operating position and a second length when the second frame member is in the second operating position.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
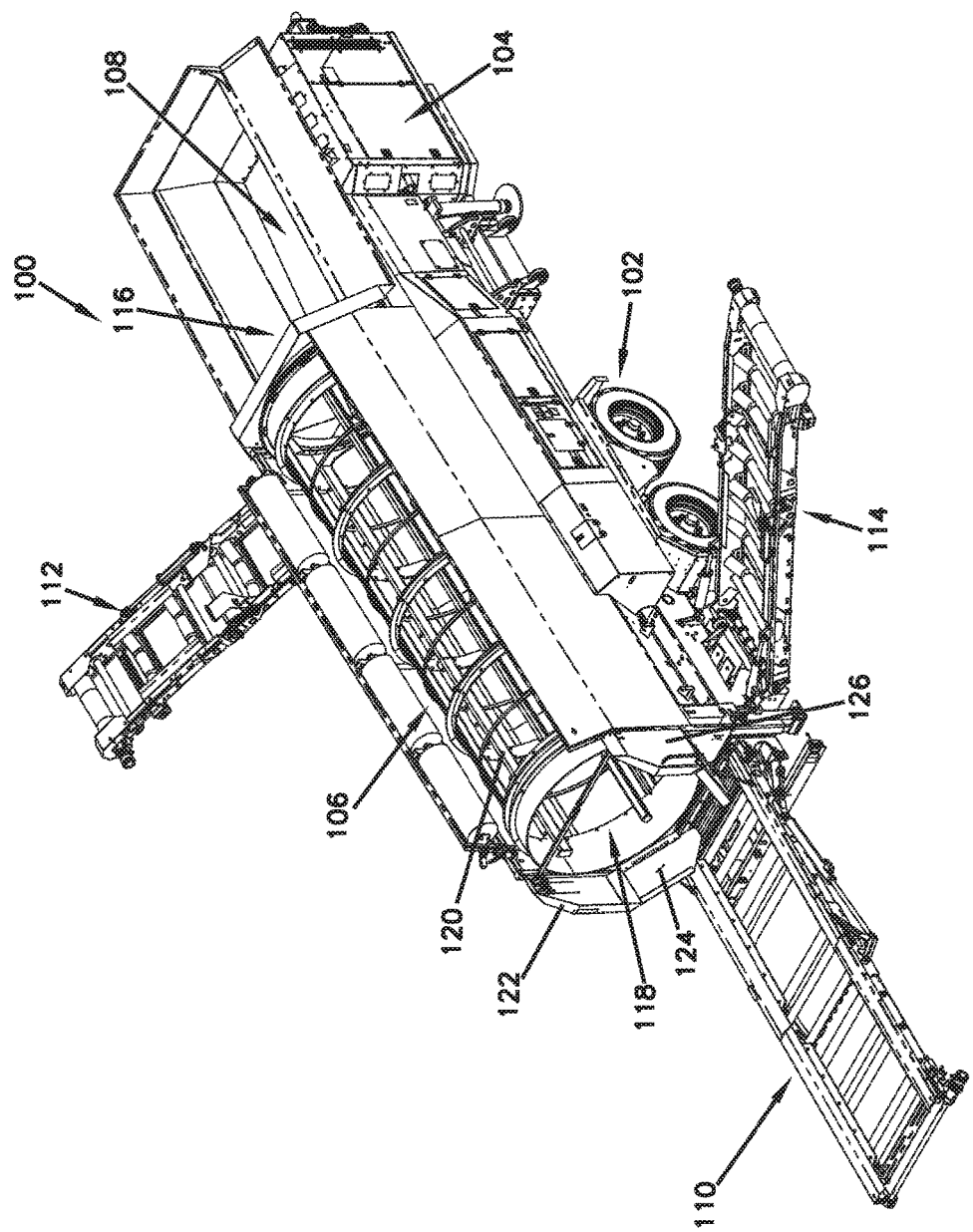
FIG. 1 illustrates a perspective view of a screening machine with an outlet conveyor in an operating position, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The deflector system disclosed herein will be described with respect to a mobile screening machine. However, the deflector system can be utilized in a variety of different applications where it is advantageous to have an automatic deploying deflector, specifically on mobile material-separation machinery, such as a trommel screen system. The deflector system disclosed herein has several advantages. The deflector system is configured to automatically fold and unfold with the movement of a conveyor. Such automatic movement eliminates the need to manually interact with the deflectors and reduces the chance that the deflectors will be inadvertently damaged by the folding or unfolding of the conveyor. Further, the deflector system is configured to adapt when the conveyor is positioned at a variety of different angles. The deflector system also does not add any additional length to the machine to which it is attached.

FIGS. 1-7 depict a screening machine 100, according to one embodiment of the present disclosure. The screening machine 100 includes a trailer support 102, a power system 104, a rotary trommel screen 106, an inlet conveyor 108, an outlet conveyor 110, a left side conveyor 112, and a right side conveyor 114. The screening machine 100 is configured to separate an unconsolidated material into separate consolidated products (e.g., based on component sizing) delivered via the outlet conveyor 110 and left and right side conveyors 112, 114.

The trailer support 102 of the screening machine 100 is configured to support the screening machine 100 during transport and operation. In some examples, the trailer support 102 includes a plurality of wheels and axles, the specific number thereof being dependent on the overall size and weight of the screening machine 100. In some examples, the trailer support 102 also includes a hitching end configured to be attached to a towing vehicle. In some embodiments, the trailer support 102 includes stabilizing elements (not shown) configured to stabilize the screening machine 100 during stationary operation. Also, in some embodiments, the trailer support 102 is configured to be transported on public roadways by a towing vehicle. In some embodiments, the trailer support 102 is configured to be transported on public roadways by a towing vehicle.

The power system 104 provides power to the screening machine 100 during operation. In some examples, the power system 104 includes an engine. In some examples, the power system 104 is an electric power system. In some examples, the power system includes a fuel cell such as a battery. In some embodiments, the engine is a diesel engine. In addition, the power system 104 includes a hydraulic system. In some embodiments, the power system 104 and the screening machine 100, in their entirety, are operable remotely or by a control panel that is in communication with the power system 104. It is to be understood that the power system 104 could be carried on the trailer support 102 or could be in the form of the engine of the pulling vehicle (e.g., hydraulic connections to engine of the pulling vehicle being able to provide the drive to power the screening machine 100).

The rotary trommel screen 106 is configured to receive and filter unconsolidated material. The rotary trommel screen 106 includes an inlet 116, an outlet 118, and a plurality of screen portions 120. In some embodiments, the rotary trommel screen 106 is generally cylindrical in shape. The rotary trommel screen 106 has an overall length measured from the inlet 116 to the outlet 118. In general, the rotary trommel screen 106 is configured to separate smaller material, proximate to the inlet 116, from larger material, which is removed proximate to, or from, the outlet 118. During operation, the rotary trommel screen 106 rotates about a longitudinal axis, which causes material contained with the rotary trommel screen 106 to be stirred and sifted. Additionally, in some embodiments, the rotary trommel screen 106 is mounted so that the rotary trommel screen 106 slopes downward from the inlet 116 to the outlet 118. Such a slope encourages material to travel from the inlet 116 to the outlet 118 during operation.

The inlet 116 of the rotary trommel screen 106 is configured to receive an unconsolidated material. In some embodiments, the unconsolidated material may be fed to the inlet 116 of the rotary trommel screen 106 by the inlet conveyor 108. In other embodiments, material may be fed to the inlet 116 by way of a material hopper. Alternatively, the outlet 118 of rotary trommel screen 106 is configured to provide an opening for material that is not removed from the rotary trommel screen 106 by way of passing through the screen portions 120.

The inlet conveyor 108 and outlet conveyor 110 are configured to introduce and remove material from the rotary trommel screen 106, respectively. The outlet conveyor 110 is configured to move material that falls from the outlet 118 of the rotary trommel screen 106 to a discharge location away from the screening machine. In the depicted embodiment, the outlet conveyor 110 is positioned longitudinally with respect to the rotary trommel screen 106. In some embodiments, the inlet and outlet conveyors 108, 110 are belt conveyors.

Figure 2:
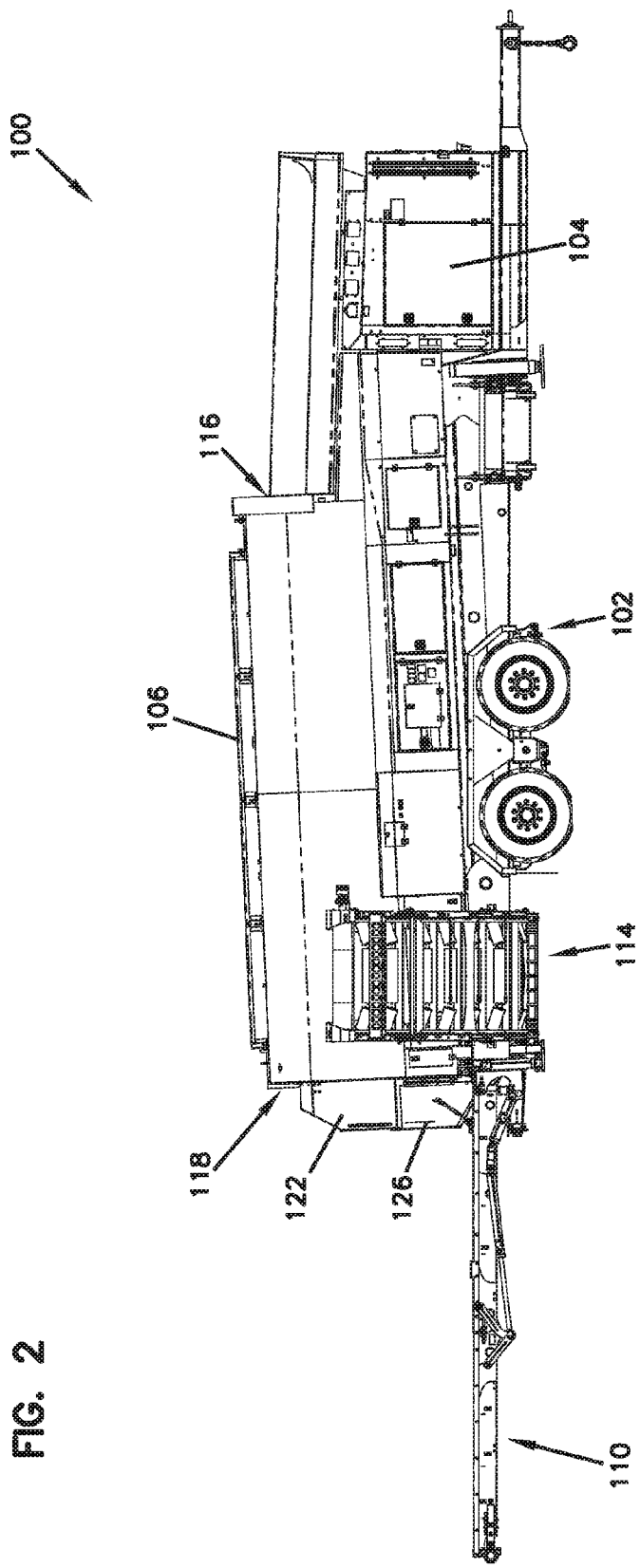
FIG. 2 illustrates a side view of the screening machine of FIG. 1 with the outlet conveyor in the operating position.
Figure 3:
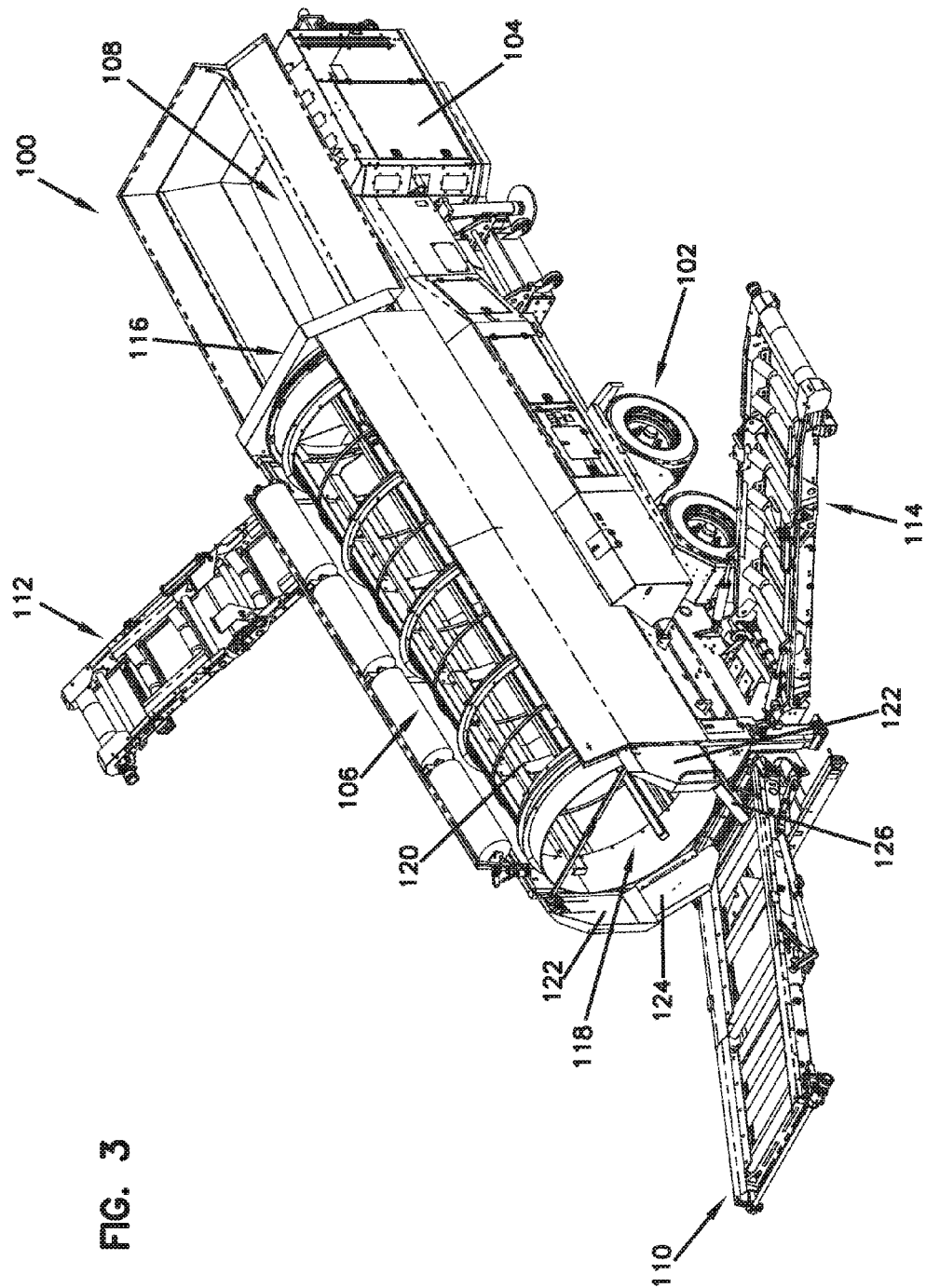
FIG. 3 illustrates a perspective view of the screening machine of FIG. 1 with the outlet conveyor in an angled position.
Figure 4:
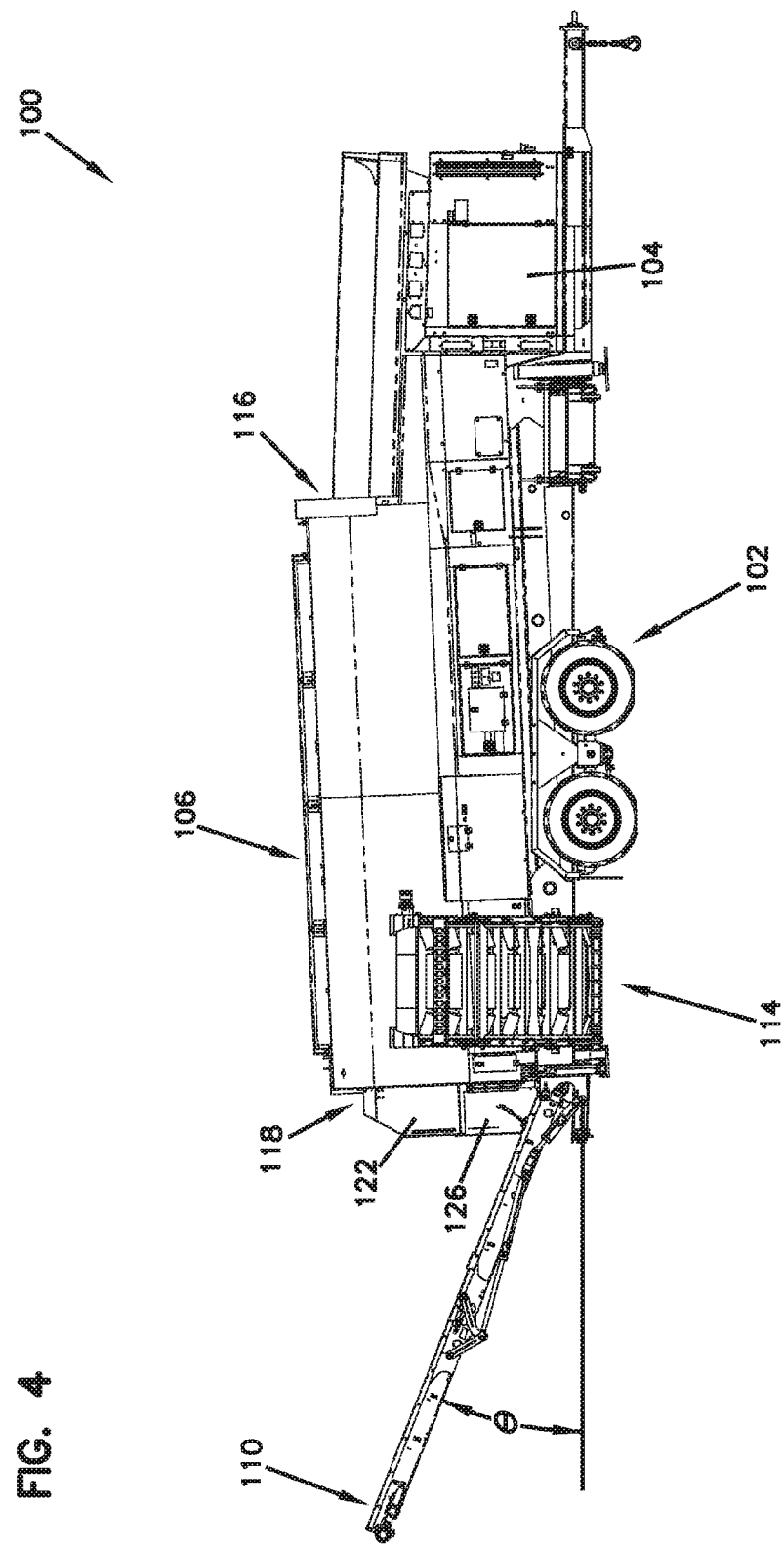
FIG. 4 illustrates a side view of the screening machine of FIG. 1 with the outlet conveyor in the angled position.

The outlet conveyor 110 has a variety of operating positions. The outlet conveyor 110 can be extended, in a generally horizontal orientation, as shown in FIGS. 1 and 2. The outlet conveyor 110 can be angled at an angle θ between horizontal and a maximum angled position (shown in FIGS. 3 and 4). In some embodiments, the angle θ is between about 0 degrees and about 45 degrees. In other embodiments, the angle θ is between about 0 degrees and about 25 degrees.

Figure 5:
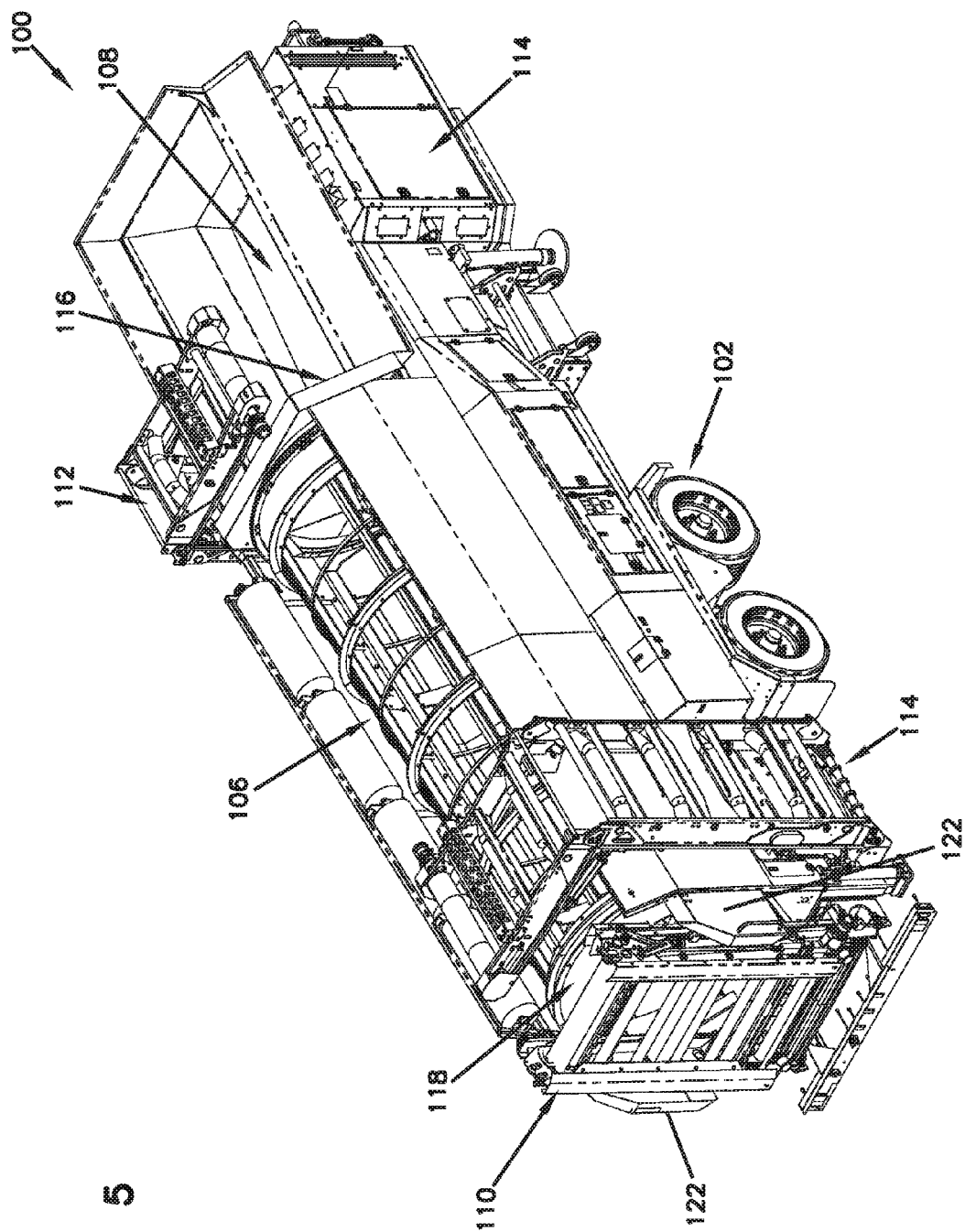
FIG. 5 illustrates a perspective view the screening machine of FIG. 1 with the outlet conveyor in a stowed position.
Figure 6:
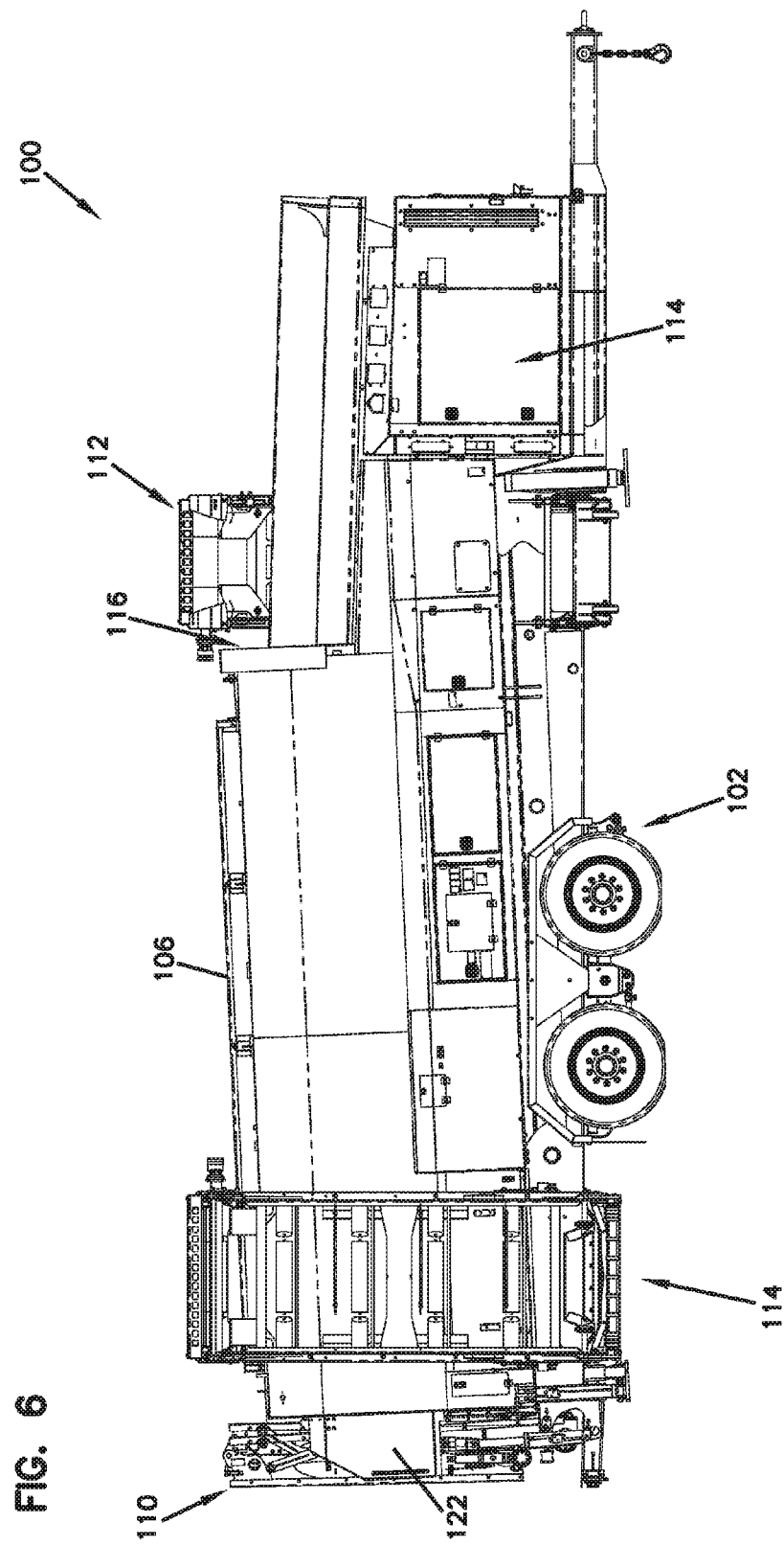
FIG. 6 illustrates a side view of the screening machine of FIG. 1 with the outlet conveyor in the stowed position.
Figure 7:
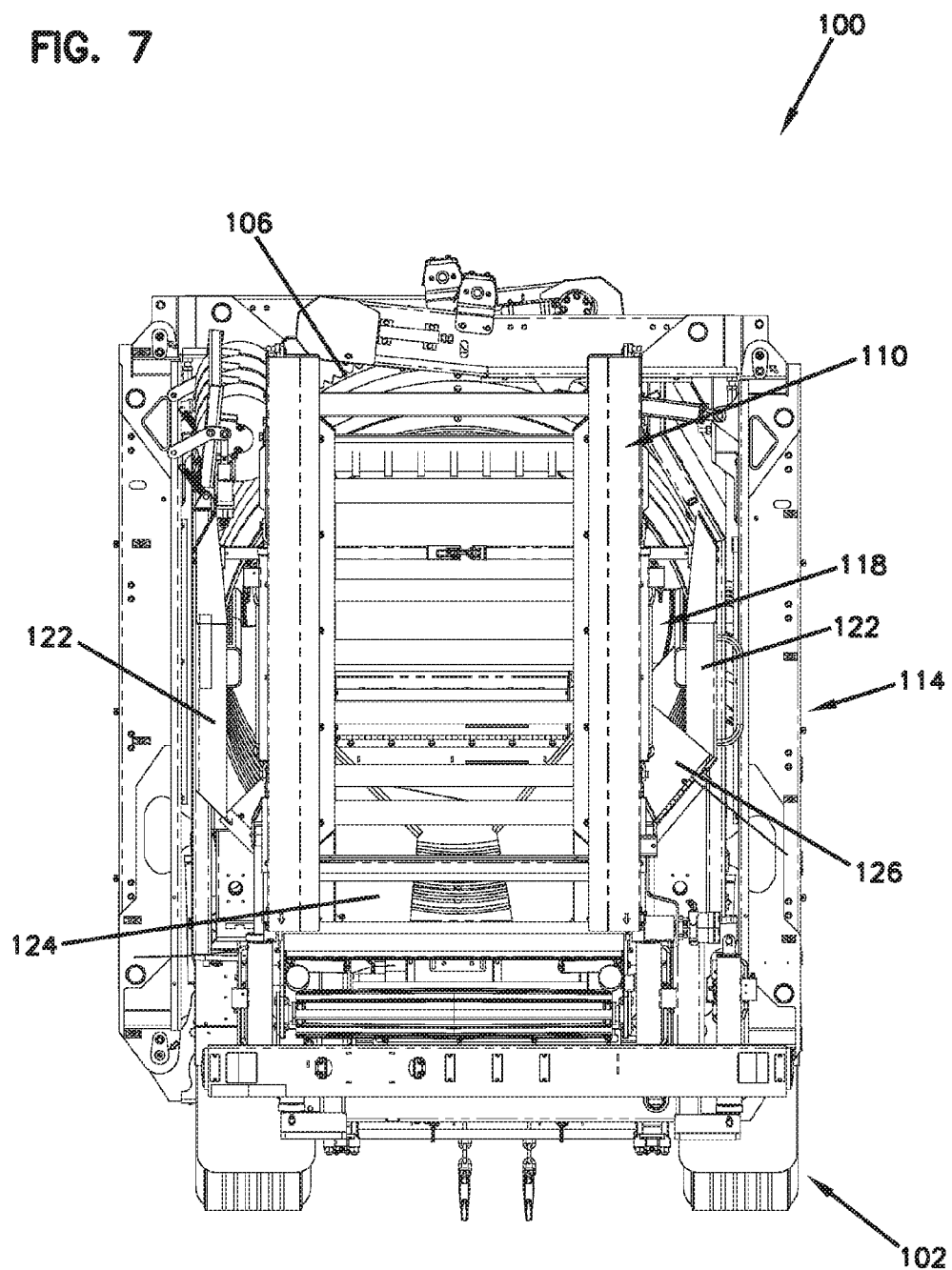
FIG. 7 illustrates an end view of the screening machine of FIG. 1 with the outlet conveyor in the stowed position.

The outlet conveyor 110 can also be folded and stowed on the screening machine 100 in a stowed positioned, as shown in FIGS. 5-7. When in the stowed position, the screening machine 100 can be transported.

Because material falls out of the outlet 118, spillage of material exiting the outlet 118 is reduced by using both fixed deflectors 122 and left and right foldable deflectors 124, 126. The deflectors 122, 124, 126 deflect material leaving the outlet 118 to the outlet conveyor 110. Also, due to the size of the outlet 118 opening, the deflectors 122, 124, 126 need to be of sufficient size to prevent material from leaving the outlet 118 and depositing on the ground, thereby not landing on the outlet conveyor 110. However, because the screening machine 100 is limited in its overall size due to on-road regulations, the left and right foldable deflectors 124, 126 also may have the ability to fold flat against the outlet 118 so that the outlet conveyor 110 can fold flat against the outlet 118 during transport (i.e., effectively reducing the transport length).

Figure 8:
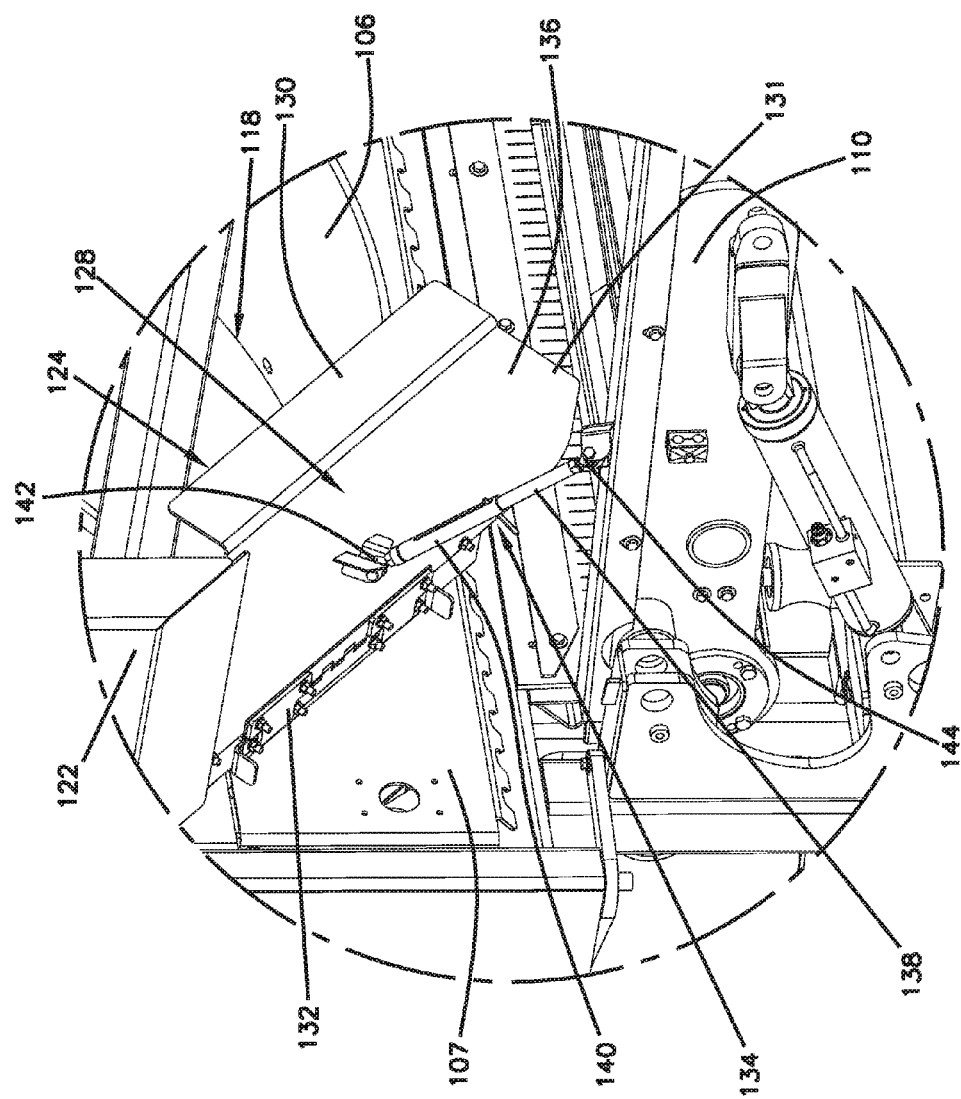
FIG. 8 illustrates a perspective view of a portion of the screening machine of FIG. 1 showing a left deflector.

The left deflector 124 is shown in FIG. 8. The left deflector 124 includes a deflector body 128, a deflector lip 130, and an angled lower side 131. The deflector 124 is shown movably attached to a trommel screen frame 107, to which the rotary trommel screen 106 is rotatably mounted. Specifically, the deflector 124 is mounted to the trommel screen frame 107 adjacent the outlet 118 by way of a hinge 132. The hinge 132 allows the deflector 124 to fold toward and away from the trommel screen frame 107 and the outlet 118.

Further, the deflector lip 130 extends away from a front side (not shown), opposite the back side 136, in a direction generally perpendicular to the deflector body 128. At a back side 136 of the deflector body 128, the deflector 124 is pivotally attached to an automatic extendable linkage 134.

The extendable linkage 134 is a variable length member. In the depicted embodiment, the extendable linkage 134 includes a piston 138 and a cylinder 140. The piston 138 is configured to travel within the cylinder 140 to allow the extendable linkage 134 to alter its length. In some embodiments, the extendable linkage 134 can be dampened.

The extendable linkage 134 includes a pair of multiplanar pivots 142, 144. In the depicted embodiment, multiplanar pivots are a first spherical bushing 142 at a first end and a second spherical bushing 144 at a second end. The first spherical bushing 142 is pivotally attached to the back side 136 of the deflector 124, and the second spherical bushing 144 is pivotally attached to the outlet conveyor 110. The first and second spherical bushings 142, 144 allow for a rotational connection at their respective attachment points. This allows the extendable linkage 134 to rotate with respect to the deflector 124 and conveyor 110 during movement of the conveyor 110 between the extended and stowed positions.

Figure 9:
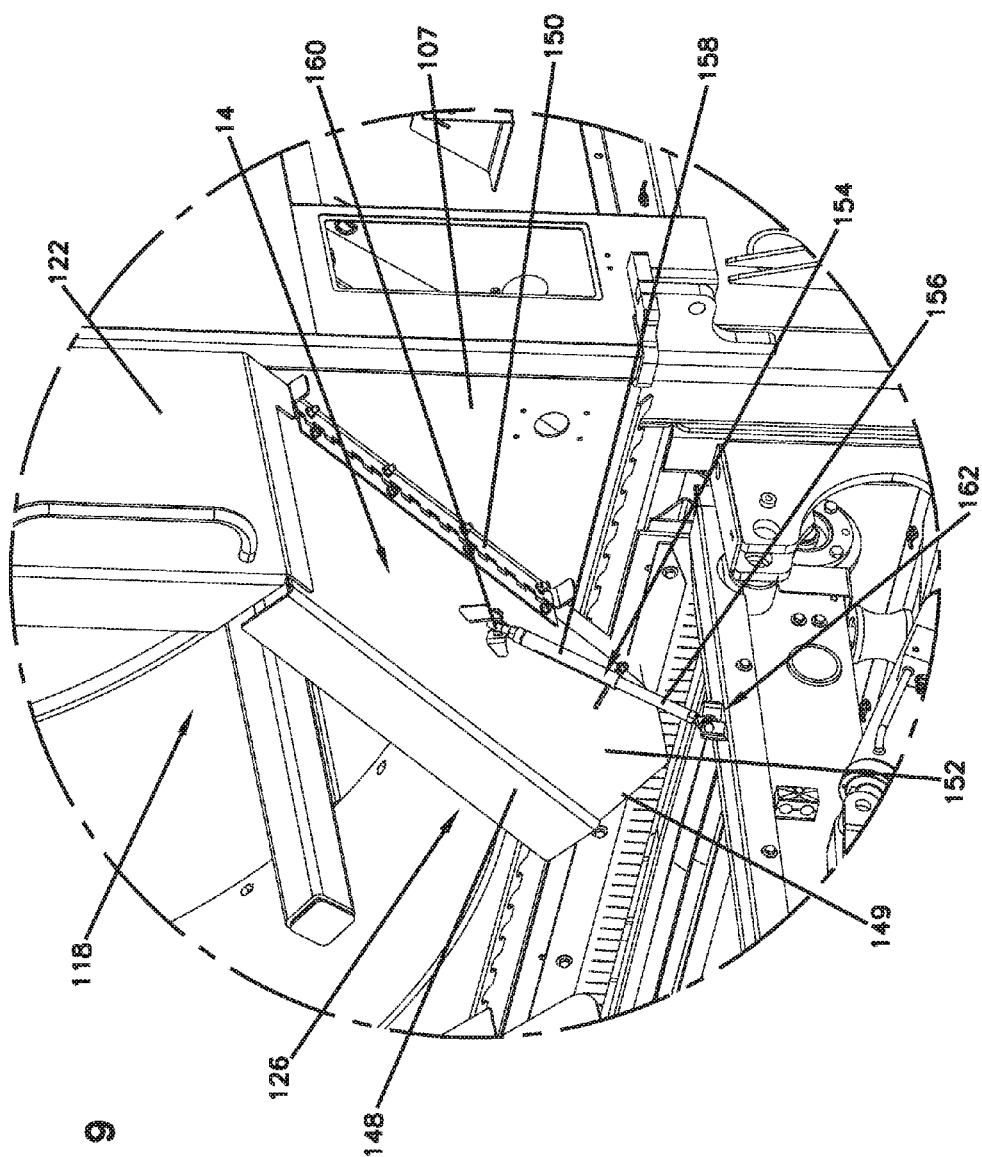
FIG. 9 illustrates a perspective view of a portion of the screening machine of FIG. 1 showing a right deflector.
Figure 10:
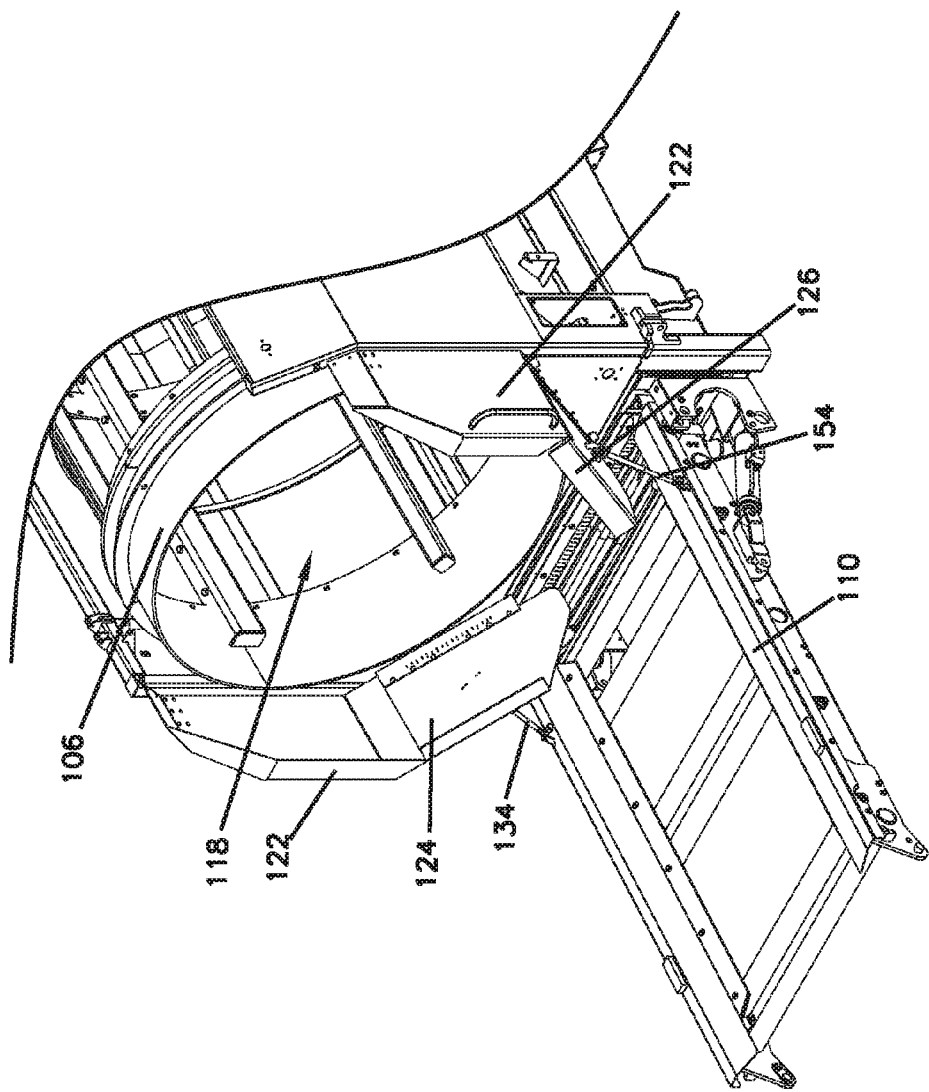
FIG. 10 illustrates a perspective view of a rear portion of the screening machine of FIG. 1 with an outlet conveyor in the operating position.

The right deflector 126 is shown in FIG. 9. The right deflector 126 is substantially similar in its shape, operation, and attachment as the left deflector 124. However, due to the differently sized fixed deflectors 122 adjacent the outlet 118 of the rotary trommel screen 106, the right deflector 126 is positioned slightly different and sized slightly larger than the left deflector 124. Like the left deflector 124, the right deflector 126 includes a body 146, a deflector lip 148, and an angled lower side 149. The deflector 126 is shown movably attached to the trommel screen frame 107 adjacent the outlet 118 by way of a hinge 150. The hinge 150 allows the deflector 126 to fold toward and away from the trommel screen frame 107.

At a back side 152 of the deflector body 146, the deflector 126 is pivotally attached to an automatic extendable linkage 154, similar to the linkage 134. The extendable linkage 134 is a variable length member and includes a piston 156 configured to travel within a cylinder 158. In some embodiments, the extendable linkage 154 can be dampened.

The extendable linkage 154 includes a pair of multiplanar pivots 160, 162. In the depicted embodiment, multiplanar pivots are a first spherical bushing 160 at a first end and a second spherical bushing 162 at a second end. The first spherical bushing 160 is pivotally attached to the back side 152 of the deflector 126, and the second spherical bushing 162 is pivotally attached to the outlet conveyor 110. The first and second spherical bushings 160, 162 allow for a rotational connection at their respective attachment points. This allows the extendable linkage 154 to rotate with respect to the deflector 126 and conveyor 110 during movement of the conveyor 110 between the extended and stowed positions.

The linkages 134, 154 provide stability to the deflectors 124, 126 while also allowing the deflectors 124, 126 to move about their hinges 132, 150 automatically when the conveyor 110 is moved between the stowed and operating positions. In one embodiment of the present disclosure, the linkages are each of a fixed length and travel in tracks attached to the conveyor 110 and deflectors 124, 126 to facilitate automatic deployment and storing of the deflectors 124, 126.

FIGS. 10-13 show a portion of the screening machine 100 when the conveyor 110 (not completely shown) is in an extended, generally horizontal position. The deflectors 124, 126 are shown in deployed positions, aligning with the fixed deflectors 122. Further, the linkages 134, 154, are extended at their maximum lengths.

Figure 11:
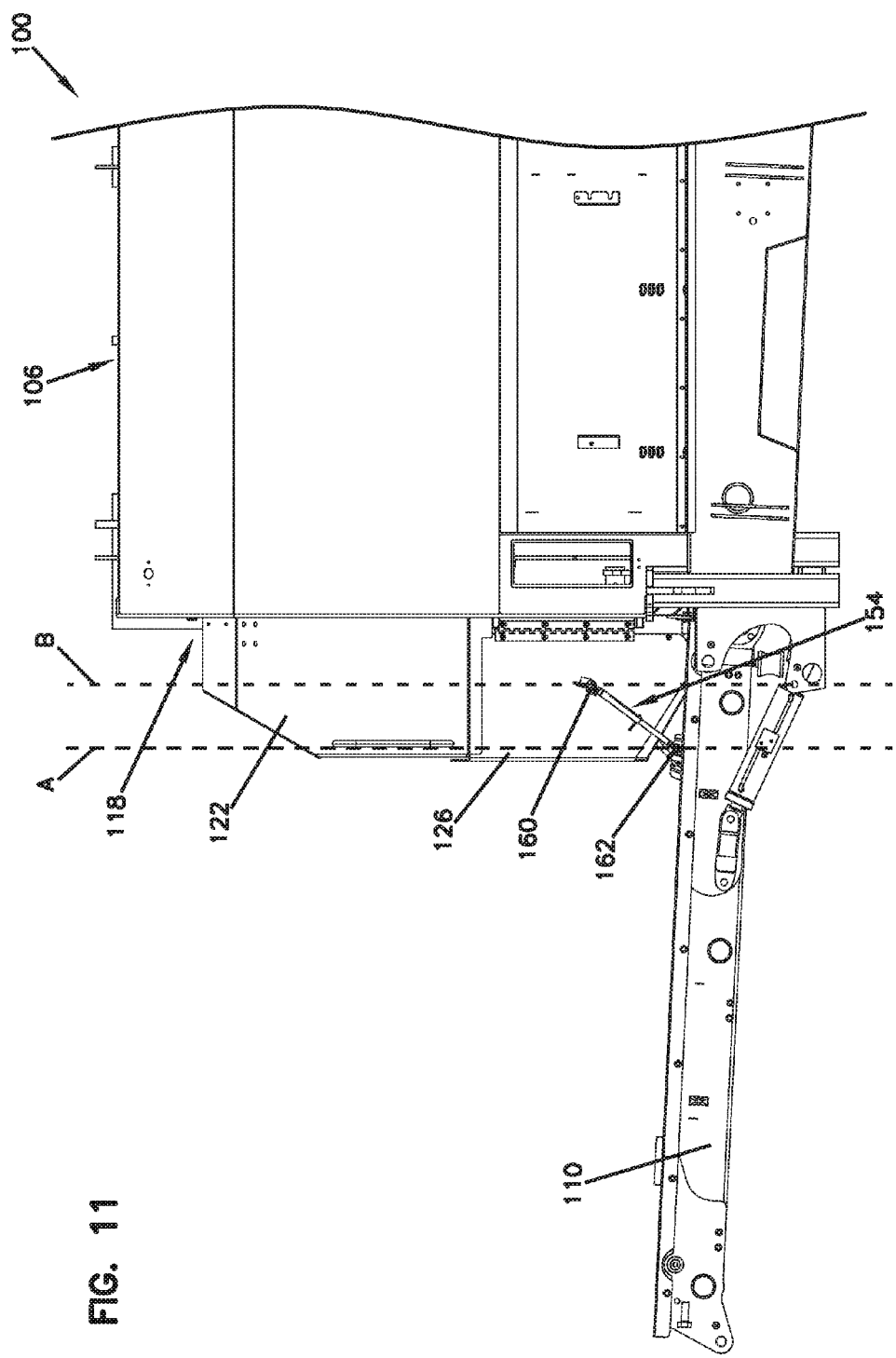
FIG. 11 illustrates a side view of the rear portion of the screening machine of FIG. 1 with an outlet conveyor in the operating position.

FIG. 11 shows a right side of a portion of the screening machine 100. A vertical plane A is shown bisecting the spherical bushing 162 mounted to the conveyor 110. A vertical plane B is shown bisecting the spherical bushing 160 mounted to the deflector 126. Vertical plane A and vertical plane B are different and generally parallel. By mounting the linkage 154 in the way shown, it allows the linkage 154 to decrease its length when the conveyor 110 is moved between the operating position and the maximum angled position (shown in FIGS. 3 and 4) without changing the positioning of the deflector 126 from the deployed position. This is advantageous as it allows the conveyor 110 to be operated in a variety of positions while maintaining the deflector 126 in a deployed position. Deflector 124 and linkage 134 operate in a substantially similar fashion.

Figure 12:
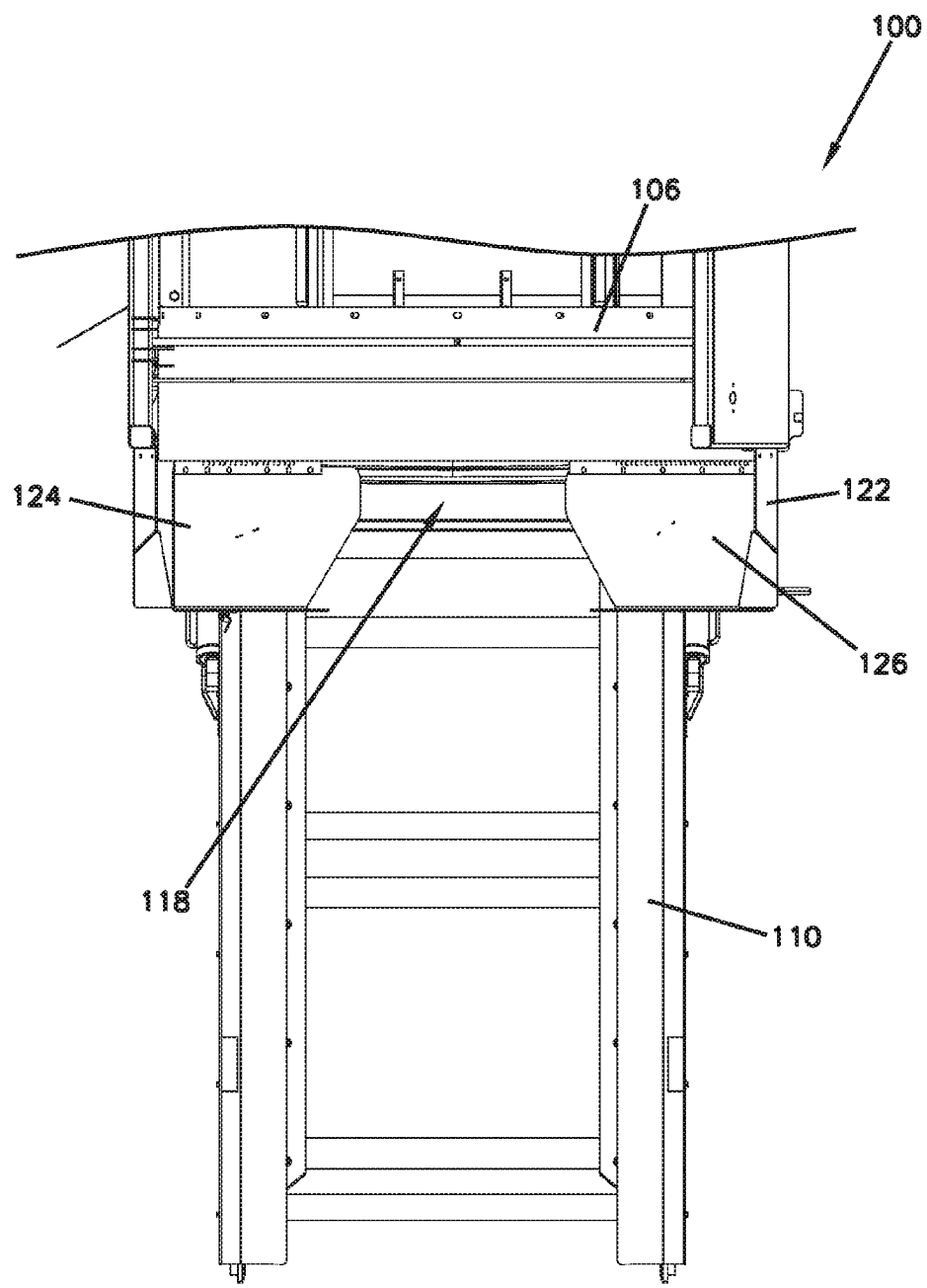
FIG. 12 illustrates a top view of the rear portion of the screening machine of FIG. 1 with an outlet conveyor in the operating position.

FIG. 12 shows a top view of the screening machine 100. As shown, the deflectors 124, 126 are positioned adjacent the outlet 118 and are generally aligned to deflect material exiting outlet 118 to the conveyor 110.

Figure 13:
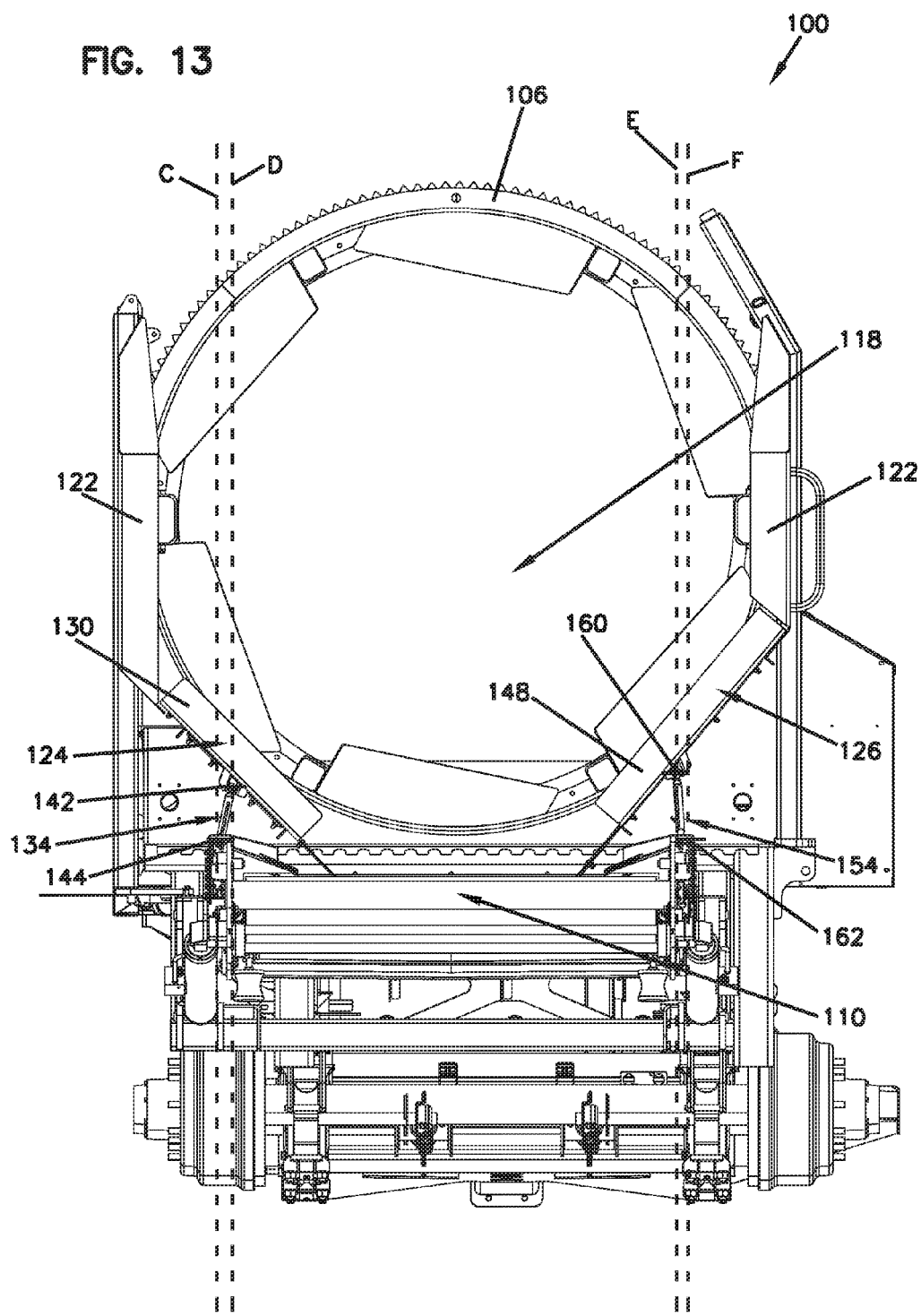
FIG. 13 illustrates an end view of the rear portion of the screening machine of FIG. 1 with an outlet conveyor in the operating position.

FIG. 13 shows an end view of the screening machine 100 when the conveyor 110 is in the operating position. The deflectors 124, 126 are shown positioned differently from one another due to the positioning of the fixed deflectors 122. However, the deflectors 124, 126 can be positioned and sized in a variety of different ways depending on the particular application and machine configuration. As shown, a vertical plane C is bisecting the spherical bushing 142 mounted to the deflector 124. A vertical plane D is shown bisecting the spherical bushing 144 mounted to the conveyor 110. Vertical plane C and vertical plane D are different and generally parallel. By mounting the linkage 134 in the way shown, it allows the linkage 134 to exert a force on the deflector 124 when the conveyor 110 moves from the operating position to the stowed position so as to guide and fold the deflector 124 along the hinge 132.

Similarly, a vertical plane E is shown bisecting the spherical bushing 160 mounted to the deflector 126. A vertical plane F is shown bisecting the spherical bushing 162 mounted to the conveyor 110. Vertical plane E and vertical plane F are different and generally parallel. By mounting the linkage 154 in the way shown, it allows the linkage 154 to exert a force on the deflector 126 when the conveyor 110 moves from the operating position to the stowed position so as to guide and fold the deflector 126 along the hinge 150.

Figure 14:
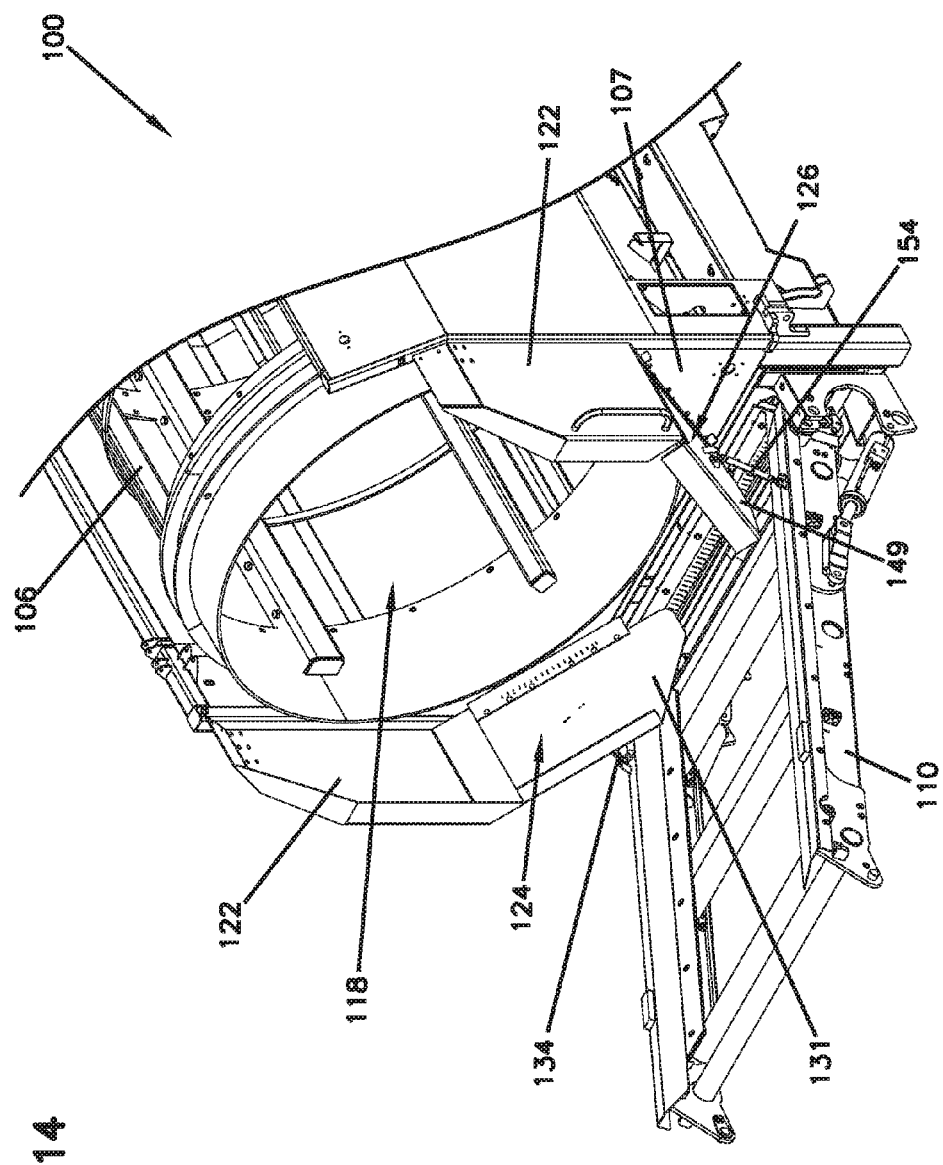
FIG. 14 illustrates a perspective view of the rear portion of the screening machine of FIG. 1 with an outlet conveyor in the angled position.
Figure 15:
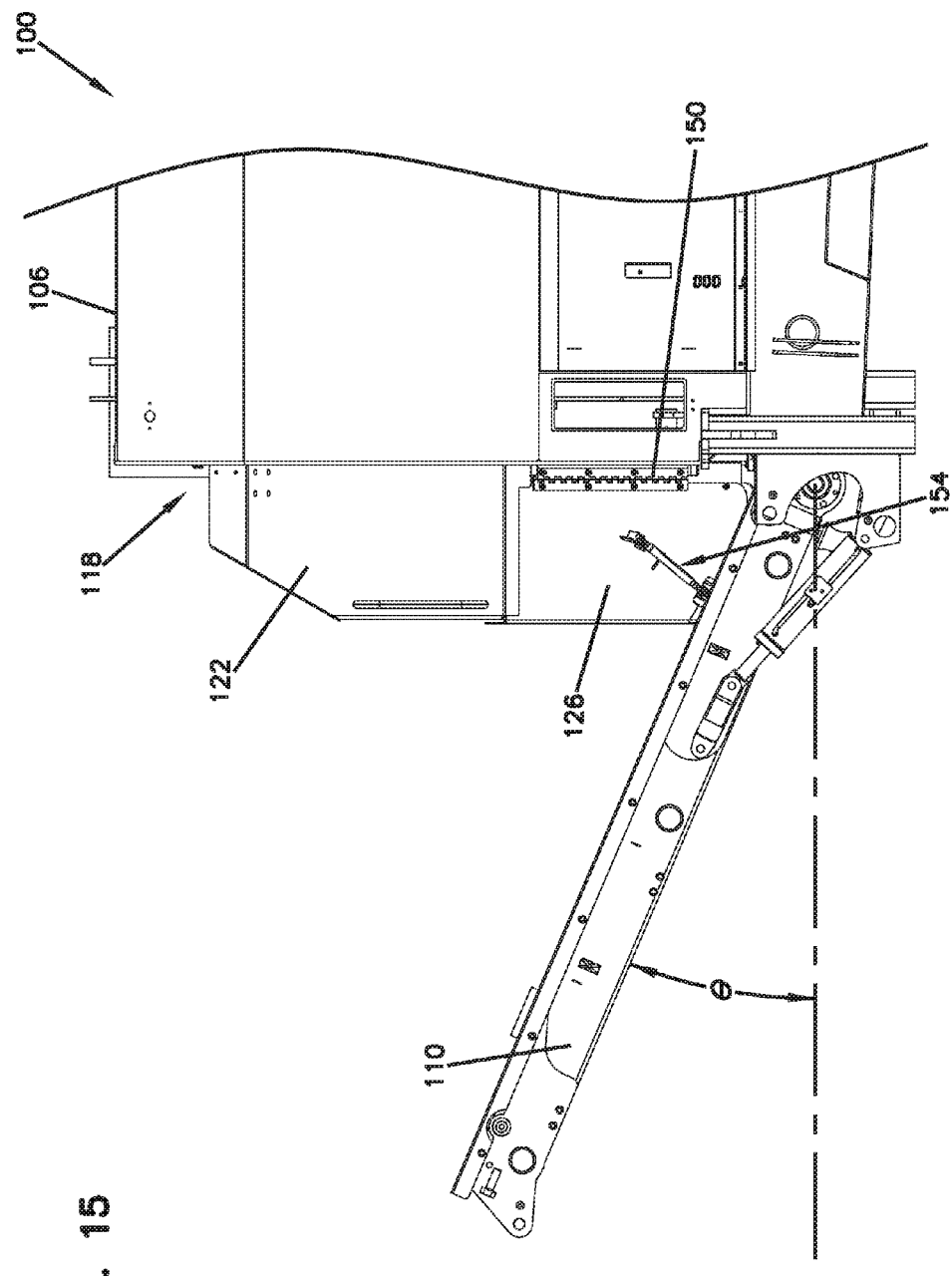
FIG. 15 illustrates a side view of the rear portion of the screening machine of FIG. 1 with an outlet conveyor in the angled position.
Figure 16:
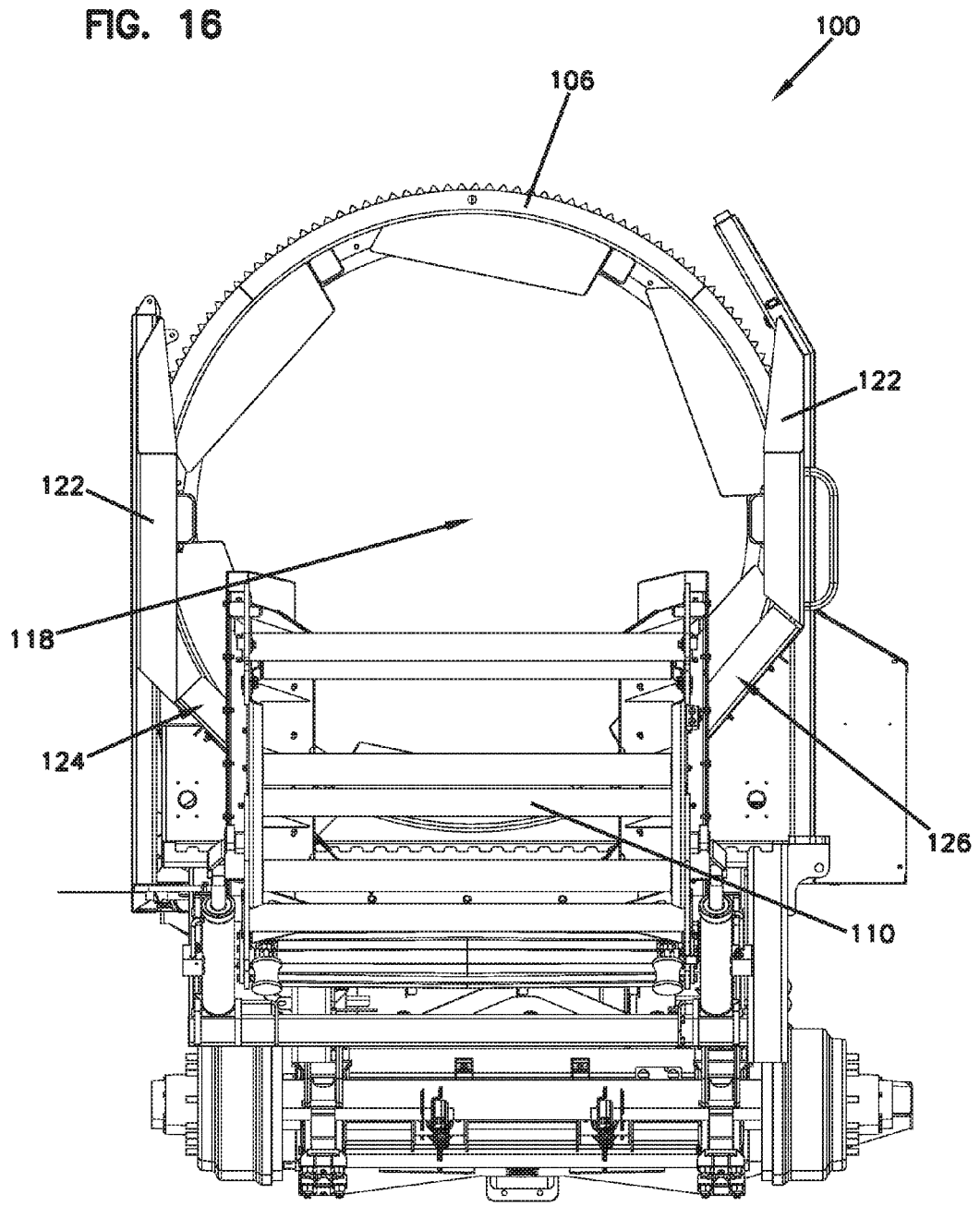
FIG. 16 illustrates an end view of the rear portion of the screening machine of FIG. 1 with an outlet conveyor in the angled position.

FIGS. 14-16 show a portion of the screening machine 100 when the conveyor 110 (not completely shown) is in an angled position. When in the angled position, the deflectors 124, 126 are still operational and in the deployed position. This is due, at least in part, to both deflectors 124, 126 having angled sides 131, 149.

As shown in FIGS. 14 and 15, the angled sides 131, 149 of the deflectors 124, 126 allow the conveyor 110 to be positioned at an angle θ without interfering with the deflectors 124, 126. That is, the angled sides 131, 149 of the deflectors 124, 126 provide an angled gap between themselves and the conveyor 110, and the conveyor 110 can move through that angled gap without interfering with the deflectors 124, 126.

The linkages 134, 154 are shown to have a length that is shorter than their maximum lengths (shown in FIGS. 10-13). Specifically, when the conveyor 110 is in a angled position (i.e., at about 25 degrees from horizontal in the depicted embodiment), the linkages 134, 154 are at their minimum lengths. When the conveyor 110 travels between the operating position and the angled position (i.e., when the angle θ ranges from about 0 degrees to about 25 degrees, in the depicted embodiment), the linkages 134, 154 extend and contract in size without changing the position of the deflectors 124, 126 from the deployed position.

When the conveyor 110 moves from the operating position to the stowed position, the linkages 134, 154 and associated deflectors 124, 126 behave in a certain way. As noted above, as the conveyor 110 raises from the operating position to the maximum angled position, the linkages 134, 154 shrink in length, while the deflectors 124, 126 stay in the deployed position. As the conveyor 110 continues to rise past the maximum angled position toward the stowed position, the movement of the conveyor 110 exerts a force on the linkages 134, 154. The linkages 134, 154 then pass on such a force to the deflectors 124, 126 that begins to guide and fold the deflectors 124, 126 about their respective hinges 132, 150, toward the outlet 118. As the conveyor 110 moves, the linkages 134, 154 rotate about the conveyor 110 and deflectors 124, 126 via their spherical bushings 142/144, 160/162 in a direction closer to perpendicular to the longitudinal axis of the screening machine 100. Such guiding and folding utilizes the spherical bushings associated with such hinges 132, 150, as the hinged motion is multi-planar in nature.

As the deflectors 124, 126 are folded inwards toward the outlet 118 and the conveyor 110 continues to rise closer to the outlet 118, the force transferred from the conveyer 110 through the linkages 134, 154 to the deflectors 124, 126 decreases until reaching zero. At such a point, the deflectors 124, 126 are not yet in their stowed position. To achieve moving the deflectors 124, 126 to their folded, stowed position, the conveyor 110 contacts both deflectors 124, 126 directly as the conveyor 110 moves closer to the outlet 118 and its stowed position. During contact of the conveyor 110 with the deflectors 124, 126, the linkages 134, 154 extend partially to allow the deflectors 124, 126 to be folded flush against the outlet 118. Further, each linkage 124, 126 continues to rotate about the conveyor 110 and deflectors 124, 126 via their spherical bushings 142/144, 160/162. This allows the screening machine 100 to have automatic folding and deploying deflectors that do not extend the overall length of the screening machine 100. This is relevant when the screening machine 100 is being transported, as there are regulations that require the screening machine 100 to have a certain length because it is an on-road vehicle.

When deploying the deflectors 124, 126, the conveyor 110 begins to lower from the stowed position toward the angled position, away from outlet 118. At this time, the linkages 134, 154 shorten to their minimum lengths and being to rotate about the conveyor 110 and deflectors 124, 126 via their spherical bushings 142/144, 160/162 toward the longitudinal axis of the screening machine. Once the linkages 134, 154 are at their minimum lengths, the deflectors 124, 126 begin to deploy with the conveyor 110 as it lowers and the linkages 134, 154 continue to rotate. The deflectors 124, 126 unfold about their hinges 132, 150 until they reach the deployed position.

In some embodiments, as the conveyor 110 lowers from its stowed position, the deflectors 124, 126 will remain in their stowed positions even as the conveyor 110 moves away from the outlet 118. Due to the connection of the linkages 134, 154 with the conveyor 110, as the conveyor 110 moves away from the outlet 118, the linkages 134, 154 will extend to their maximum length at a point during the lowering of the conveyor 110. Once at their maximum lengths, the linkages 134, 154 will exert a force on the deflectors 124, 126, thereby pulling them into deployment.

Because the linkages 134, 154 have the ability to both extend, compress, and rotate in a multi-planar fashion about their spherical bushing attachment points, the linkages 134, 154 can complete the folding and unfolding of the deflectors 124, 126 when the conveyor 110 is positioned in a spaced away orientation from the deflectors 124, 126 (i.e., the extended or angled position) or when the conveyor 110 is in a very close proximate position (i.e., stowed position).

Figure 17:
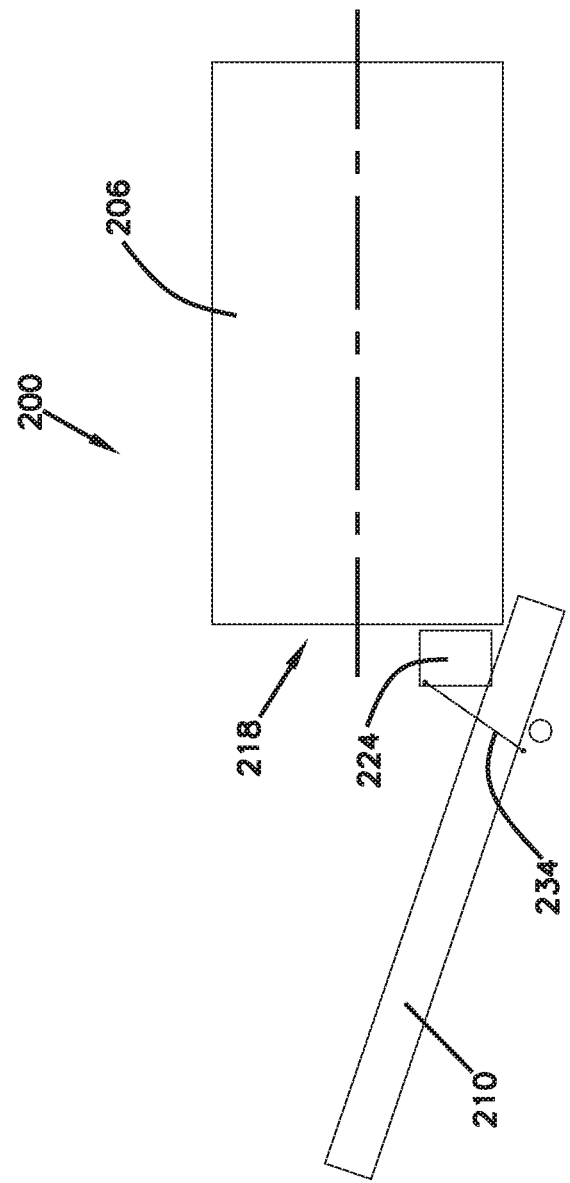
FIG. 17 illustrates a side schematic view of a screening machine with an outlet conveyor in an operating position, according to one embodiment of the present disclosure.
Figure 18:
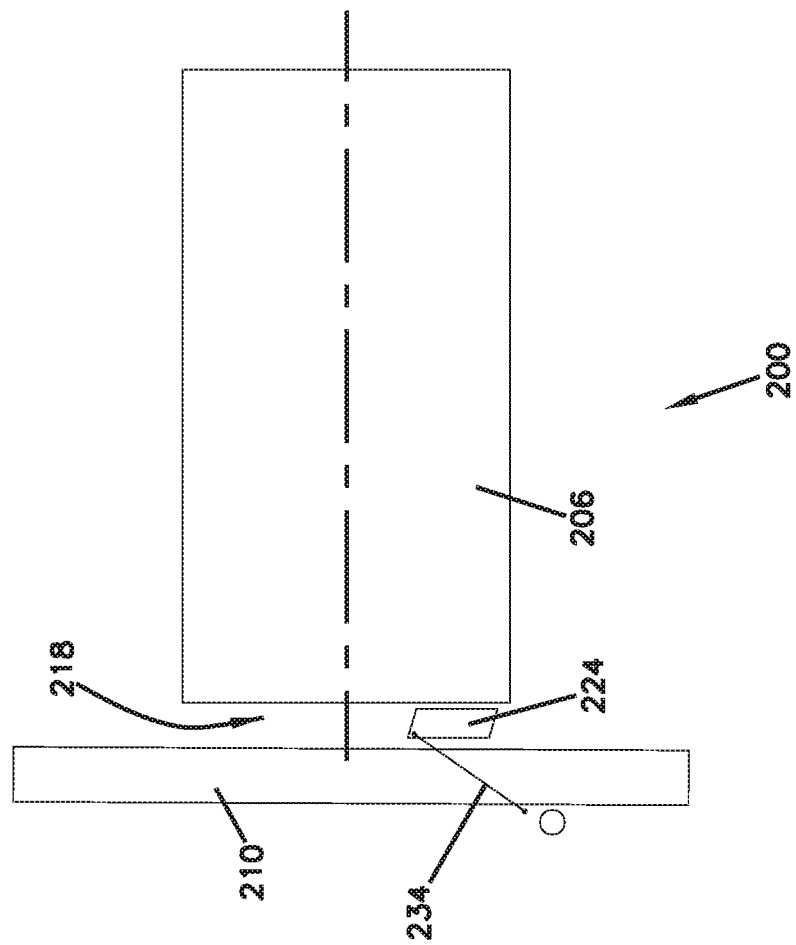
FIG. 18 illustrates a side schematic view the screening machine of FIG. 17 with the outlet conveyor in a stowed position.

FIGS. 17-18 depict a screening machine 200, according to one embodiment of the present disclosure. The screening machine 200 is substantially similar to the screening machine 100 described above. The screening machine 200 utilizes a linkage 234 that is non-extendable and attached to a deflector 224. In some examples, the screening machine 200 includes a pair of deflectors and a pair of linkages. The screening machine 200 further includes a rotary trommel screen 206, an output conveyor 210, and an outlet 218. The outlet conveyor 210 and deflector 224 each have an operating position, as shown in FIG. 17, and a stowed position as shown in FIG. 18.

The linkage 234 is pivotally connected to both the deflector 224 and the outlet conveyor 210. As the outlet conveyor 210 is moved from the stowed position to the operating position, the linkage 234 moves with the outlet conveyor 110, which thereby moves the deflector 224 into the operating position by pulling on the linkage 234. Further, as the outlet conveyor 210 is moved from the operating position to the stowed position, the outlet conveyor 210 transfers a force through the linkage 234 to move the deflector 224 to the stowed position along with the outlet conveyor 210. As the linkage 234 moves with the outlet conveyor, the linkage 234 pivots about its mounting points on the deflector 224 and the outlet conveyor 210. In some examples, the linkage 234 is attached to the deflector 224 and to the outlet conveyor 210 via multi-planar pivots. In some examples, the linkage 234 includes a first spherical bushing at a first end and a second spherical bushing at a second end.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. A deflecting system for a trommel screen comprising:
a rotary trommel screen frame;
a rotary trommel screen having an inlet end and an outlet end and being rotatably attached to the rotary trommel screen frame;
a pair of deflectors hingedly attached to the rotary trommel screen frame and positioned at the outlet end of the rotary trommel screen;
a conveyor pivotally attached to the rotary trommel screen frame and positioned adjacent the outlet end of the rotary trommel screen, the conveyor having a stowed position and an operating position; and
a pair of automatic linkages each pivotally attached to both one deflector and the conveyor, wherein the linkages move the deflectors when the conveyor moves between the stowed position and the operating position,
wherein the deflectors are configured to direct material exiting the outlet of the rotary trommel screen toward the conveyor when the conveyor is in the operating position.

2. The deflecting system of claim 1, wherein the operating position of the conveyor is an operating position that is substantially horizontal with a ground surface.

3. The deflecting system of claim 1, wherein the operating position of the conveyor is an angled operating position between an operating position that is substantially horizontal with a ground surface and the stowed position.

4. The deflecting system of claim 1, wherein the automatic linkages have a fixed length.

5. The deflecting system of claim 1, wherein the automatic linkages are each extendable.

6. The deflecting system of claim 5, wherein the length of the extendable linkages first decreases and then increases when the conveyor moves from the stowed position to the operating position.

7. The deflecting system of claim 1, wherein the pair of automatic linkages have a stowed position and a deployed position corresponding with the stowed position and the operating position of the conveyor respectively.

8. The deflecting system of claim 1, wherein the automatic linkages are each pivotally connected to both one deflector and the conveyor using multi-planar pivots.

9. The deflecting system of claim 8, wherein the multi-planar pivots are spherical bushings.

10. A deflector system for a trommel screen comprising:
a deflector body hingedly attached to a trommel screen frame;
a conveyor movable with respect to the trommel screen frame, the conveyor having a stowed position and an operating position; and
an automatic linkage pivotably attached to the deflector body and to the conveyor, wherein the linkage moves the deflector body when the conveyor moves between the stowed position and the operating position,
wherein the deflector is configured to direct material exiting the outlet of the trommel screen toward the conveyor when the conveyor is in the operating position.

11. The deflector system of claim 10, wherein the automatic linkages have a fixed length.

12. The deflector system of claim 10, wherein the automatic linkages are each extendable.

13. The deflector system of claim 12, wherein the length of the extendable linkage first decreases and then increases when the conveyor moves from the stowed position to the operating position.

14. The deflector system of claim 10, wherein the conveyor has an angled operating position between the operating position and the stowed position.

15. The deflector system of claim 14, wherein, when the conveyor is in the angled position, the extendable linkage is at its shortest length.

16. The deflector system of claim 10, wherein the automatic linkages are each pivotally connected to both the deflector and the conveyor using multi-planar pivots.

17. The deflector system of claim 16, wherein the multi-planar pivots are spherical bushings.

18. The deflector system of claim 10, wherein, when the conveyor is in the stowed position, the deflector body is in a folded, stowed position between the conveyor and trommel screen frame.

19. A deflector system comprising;
a mobile material separator machine having a frame, the frame having a first frame member; a deflector body movably attached to the first frame member, the deflector body having a deployed position and a stowed position;
a second frame member movable with respect to the first frame member, the second frame member having at least a stowed position, a first operating position, and a second operating position, wherein the deflector body is in stowed position when the second frame member is in the stowed position, and the deflector body is in the deployed position when the second frame member is in the first operating or second operating positions; wherein the deflector body is configured to deflect material in a direction toward the second frame member when in the deployed position; and an automatic extendable linkage pivotably attached to the deflector body and to the second frame member, wherein the extendable linkage has a first length when the second frame member is in the first operating position, and a second length when the second frame member is in the second operating position.

20. The deflector of claim 19, wherein the deflector system body includes a first side and a second side, wherein the extendable linkage is attached at the second side, and wherein a deflector lip extends away from the first side.

21. The deflector of claim 19, wherein the deflector system body is attached to the first frame member via a hinge.

22. The deflector of claim 19, wherein the deflector system body includes an angled side.

23. The deflector system of claim 19, wherein the extendable linkage includes a first spherical bushing at a first end and a second spherical bushing at a second end.

24. The deflector system of claim 19, wherein the extendable linkage includes a cylinder member and a piston member, and wherein the piston member is movable within the cylinder member.

\* \* \* \* \*

UNITED STATES PATENT AND TRADEMARK OFFICE
CERTIFICATE OF CORRECTION

PATENT NO.         : 10,118,197 B2
APPLICATION NO.    : 15/429347
DATED              : November 6, 2018
INVENTOR(S)        : Boese It is certified that error appears in the above-identified patent and that said Letters Patent is hereby corrected as shown below:

In the Claims

Column 10, Line 46, Claim 19: "is in stowed position" should read --is in the stowed position--

Signed and Sealed this
Fourteenth Day of May, 2019

Andrei Iancu
*Director of the United States Patent and Trademark Office*